April 29, 1969   J. TUSA ET AL   3,441,643
MANUFACTURE OF FOOTWEAR
Original Filed April 22, 1963
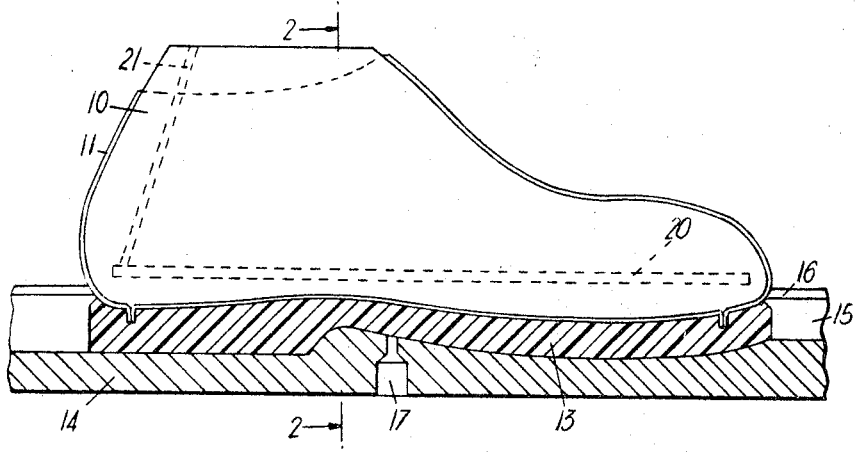
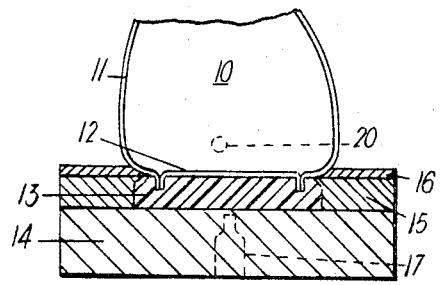

United States Patent Office 3,441,643
Patented Apr. 29, 1969

3,441,643
MANUFACTURE OF FOOTWEAR
John Tusa, Horndon-on-the-Hill, Essex, England, and Johannes Gerardus Janssen, Willowdale, Toronto, Canada, assignors to Bata Shoe Company Inc., Belcamp, Md.
Continuation of application Ser. No. 274,565, Apr. 22, 1963. This application Feb. 10, 1967, Ser. No. 615,264
Claims priority, application Great Britain, Apr. 24, 1962, 15,456/62
Int. Cl. B29h 7/08; B29f 1/022; A43d 65/00
U.S. Cl. 264—244                          2 Claims

ABSTRACT OF THE DISCLOSURE

The production of shoes having a molded thermoplastic material outer sole adhered to a textile component in which a last having such textile component thereon is positioned in molding relationship to a cavity adapted to receive thermoplastic outer sole forming material and applying heat to a mold closing portion of the last with the heat being transferred therefrom to at least that area of the textile component to be adhered to the outer sole for raising the temperature of such area to substantially above ambient temperature. The thermoplastic sole forming material is preheated and then injected in hot molten condition into the cavity to form an out sole adhered to the textile component upon the setting of the material.

---

This application is a continuation of application S.N. 274,565, filed Apr. 22, 1963, and now abandoned.

This invention relates to the manufacture of shoes and like articles of footwear, particularly boots, slippers and sandals, hereinafter called shoes, wherein a sole composed of a plastic material is molded by injection-molding to a lasted upper applied to the mouth of the mold by which the sole is formed, the plastic material being injected in a hot molten condition into the mold, and wherein the upper is made of woven textile material, especially canvas.

In our work on the manufacture of canvas shoes in the manner described we have been confronted with the problem how to contrive that the hot plastic material will adhere with satisfactory bonding strength to the canvas upper. It was discovered that the hot plastic, immediately upon coming into contact with the cool or comparatively cooler canvas, forms a skin which prevents the plastic from penetrating the interstices of the woven textile.

It has been found that satisfactory adherence can be achieved if the last on which the canvas upper has been lasted is directly heated to a suitable temperature of the order of about 100° C. before injection of the hot molten plastic material.

Therefore, the invention is directed to a method of manufacturing shoes having woven textile uppers by injection-molding which comprises the steps of positioning a lasted upper in operative relation to a mold, heating the sole portion of the last to a temperature above the temperature which the sole portion would reach by the natural transfer of heat during an injection molding operation or a succession of said operations, and injecting plastic material in a hot molten condition into the mold to form a sole.

The invention also relates to an injection molding apparatus for performing the aforesaid method including a last provided with means for directly heating at least the sole portion thereof, a mold adapted to fit a lasted upper, and means for heating plastic material to be injected into the mold to form a sole in conjunction with said sole portion.

The invention also relates to a shoe of the type stated whenever made by the aforesaid method.

In performing the present method, any thermoplastic material appropriate to the injection molding in the shoe making industry may be used.

In an example, a metal last is formed with one or more long internal recesses extending along its bottom portion and into which is mounted one or more electric heating elements adapted to heat at least the bottom portion or sole of the last to a suitable temperature, say about 100° C. The shoe includes an upper-and-insole unit in the form of a sack, or sock, with the insole being joined to the upper by stitching or equivalent means.

More particularly, the mold comprises a base and a pair of separate side members which are slidable upon the base to adjoin at the toe and heel ends thereof and which, when in adjoining relationship, form with the base a molding cavity having the desired shape to be imparted to the ultimate plastic sole. The side members are formed or provided with a peripheral lip defining the mold mouth which is closed by the heated lasted unit when applied to the lip. The arrangement is such that the upper-and-insole unit, lasted in any suitable manner, is applied to the lip of the mold and the bottom textile material of the unit is exposed in a hot condition within the molding cavity where in this condition the textile material is contacted by the injected hot plastic material. The one or more heating elements are effective to heat the last bottom so that the bottom textile material, that is, the area thereof that is to be contacted by the hot molten plastic, is at the desired temperature before the hot molten plastic is injected.

Thus, as previously mentioned, the last heated by the electric element or elements therein is heated to the order of about 100° C. This heating of the last will inherently transfer heat to the area of the textile component that is adjacent the heating elements mounted therein. This transfer will raise the temperature of such area of the textile component. Therefore, the textile material is conditioned to be susceptible to penetration by the hot molten settable thermoplastic material. Consequently, when the heated lasted unit is placed in mold closing relation with respect to the molding cavity and the hot molten thermoplastic material is injected into the cavity into direct contact with the heated textile area, the fact that the textile area that is exposed to the hot plastic has been heated will allow the molten and fluent thermoplastic material to penetrate the interstices of the textile material without forming a skin thereover and thus assuring proper adhesion between the plastic and the textile.

The foregoing example is illustrated in the accompanying diagrammatic drawing in which FIG. 1 is a side view partly in section of a lasted upper-and-insole unit applied to a mold, and FIG. 2 is a section taken along the line 2—2 of FIG. 1, the view looking in the direction of the arrows.

In the drawing, a last preferably of metal is indicated at 10, a canvas upper at 11, a canvas insole at 12, a plastic outsole which may also include a heel at 13, a mold base at 14, and slidable side members at 15. A top plate 16 is provided for each side member 15 and to define the lip of the mouth is shaped or contoured of the molding cavity, and the entry port for an injector nozzle is disclosed at 17.

As shown, an electric heating element 20 is fitted into a recess 20′ in the lowermost portion of the last and extends longitudinally from toe to heel thereof. A small-bore passage 21 leading from the exterior of the last is provided for the electric wiring operably associated with the heating element.

Therefore, it is clear that this invention is predicated to the production of shoes having a molded thermoplastic material outer sole adhered to a textile upper component in which a last having such component thereon is positioned in molding or mold closing relation with a mold having a cavity adapted to receive the thermoplastic outer sole forming material. The mold closing portion of the last is heated to transfer heat therefrom to at least that area of the textile component that is to be adhered to the outer sole. This heating of the last in the order of 100° C. raises the temperature of that area of the textile component to substantially above ambient temperature. This temperature will condition the heated portion of the textile component to penetration by hot thermoplastic material. The thermoplastic sole forming material is heated and then injected into the cavity in hot molten settable condition so that the fluent thermoplastic material penetrates the interstices of the heated area of the textile component that is contacted by the plastic to assure proper adhesion. Thereafter the thermoplastic material sets to form a molded outer sole adhered to the textile upper component.

What is claimed is:

1. In the production of shoes having a molded thermoplastic material outer sole adhered to a textile component and in which a last having such textile component thereon is positioned in molding relation to a mold having a cavity adapted to receive thermoplastic outer sole-forming material, the improvement comprising solely heating a mold closing portion of the last to such a degree and transferring heat therefrom to at least that area of such textile component that is to be adhered to the outer sole so to raise the temperature of such area to substantially above ambient temperature, preheating the thermoplastic sole-forming material, and injecting such material in hot molten settable condition into such cavity while said area of such textile component is still substantially above ambient temperature to form an outsole adhered to such component upon setting of such material.

2. In the production of shoes having a molded thermoplastic material outer sole adhered to a textile material upper component and in which a metal last having such textile material component thereon is positioned in molding relation to a mold having a cavity adapted to receive thermoplastic sole-forming material, the improvement comprising the precise combination of solely heating a mold-closing portion of the last to a degree sufficient to transfer such heat to the area of the textile material component that is to be adhered to such thermoplastic material as to effectively retard a skin from forming on the surface of the thermoplastic material first in contact with such textile material component and thereby augment penetration by such thermoplastic material, and injecting hot molten settable thermoplastic material into such cavity and thus into direct contact with such heated textile material area so that the fluent thermoplastic material penetrates the interstices of such textile material component to assure proper adhesion, and thereafter allowing such thermoplastic material to set to form a molded outer sole adhered to said upper.

References Cited

UNITED STATES PATENTS

| | | | |
|---|---|---|---|
| 2,824,034 | 2/1958 | Worby | 264—257 X |
| 2,994,920 | 8/1961 | Patera | 264—244 X |

FOREIGN PATENTS

| | | |
|---|---|---|
| 1,271,522 | 8/1961 | France. |

ROBERT F. WHITE, *Primary Examiner.*

T. J. CARVIS, *Assistant Examiner.*

U.S. Cl. X.R.

264—257, 265, 273